March 15, 1927.  
R. N. EHRHART  
WATER HEATING SYSTEM FOR POWER PLANTS  
Filed May 19, 1920
1,620,807
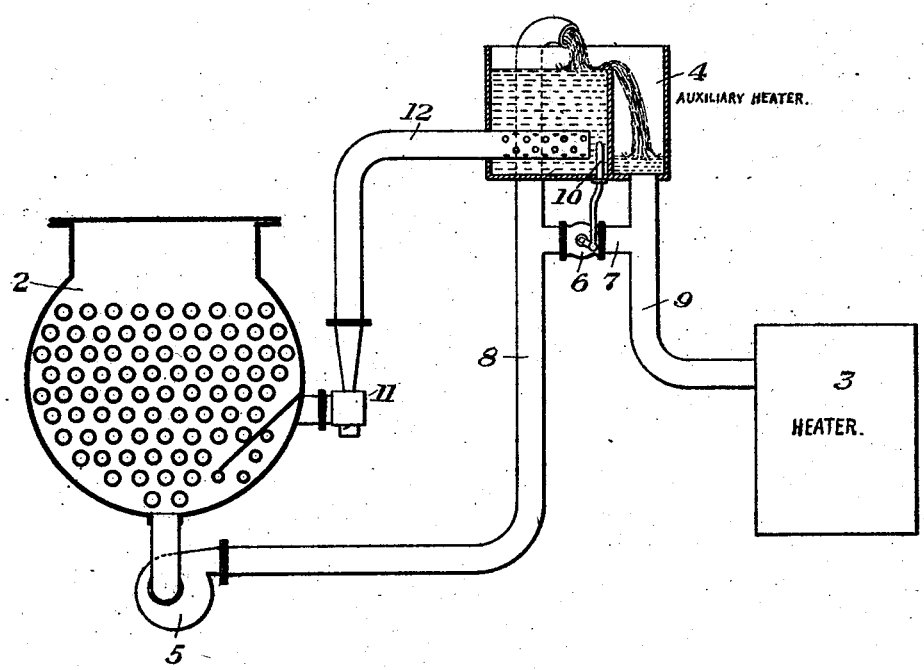
Inventor  
R. N. Ehrhart  
By Bakewell, Byrnes & Parmelee  
his Attorneys Patented Mar. 15, 1927.

1,620,807

UNITED STATES PATENT OFFICE.

RAYMOND N. EHRHART, OF PITTSBURGH, PENNSYLVANIA, ASSIGNOR TO ELLIOTT COMPANY, OF PITTSBURGH, PENNSYLVANIA, A CORPORATION OF PENNSYLVANIA.

WATER-HEATING SYSTEM FOR POWER PLANTS.

Application filed May 19, 1920. Serial No. 382,655.

The figure is a diagrammatic view of one form of heating apparatus embodying my invention.

My invention has relation to a water-heating apparatus for power systems; and more particularly to heaters which are adapted for use in connection with power plants employing condensers from which a mixture of air and steam is exhausted by means of ejectors. When ejectors are applied to condensers, they exhaust the air from the same as well as steam, so that the discharge from the ejector is a mixture of steam and air. In power plants where ejectors are used for this purpose, the exhaust from the ejectors is usually turned into some sort of a feed water heater, so that the heat in the steam exhaust from the condenser is utilized in heating the feed water before the latter goes to the boilers. In this way, the heat from the ejector is not a total loss. Some objection, however, has been raised to the use of ejectors for this purpose on account of the high air content of the steam which is turned into the feed water heater. In the opinion of some engineers the steam ejector which takes air from the condenser (part of the air coming from the condensed steam and part being due to the infiltration of air through the castings) is not a satisfactory apparatus, inasmuch as all this air is turned into the feed water heater, so that the water fed to the boilers is then heavily recharged with the air from the ejector.

My invention is designed to provide means for overcoming this objection. It is a well known fact that water at low temperatures and at atmospheric pressure may carry a large amount of air in it. If the temperature of the water is raised, its air-holding capacity is considerably diminished, and if the water is actually boiled, the great bulk of the air can be expelled. Ordinarily, in a power plant system, such as above referred to, the feed water supplied to the feed water heater is in such large quantity that the steam from the ejectors is only sufficient to raise its temperature a small amount. It is therefore obvious that if the full amount of feed water is used to condense the steam from the ejector, the temperature of the water would not be raised sufficient to expel much of the contained air. If, however, means are provided to automatically keep the water delivered to the heater in such a volume that the temperature in the heater will be approximately at the boiling temperature, then the great bulk of the contained air can be expelled from the water.

My invention provides means whereby this may be accomplished so that the temperature of the water may be always kept either at the boiling temperature or fairly close to it. This works to advantage in two ways, first, the amount of water used to condense the steam from the ejectors is limited; therefore, its air-carrying capacity is limited; second, by reducing the amount of water for the condensation of steam from the ejector, the water is heated to a higher temperature which further expels any air that may have been absorbed from the fluid delivered by the ejector.

My invention will be best understood by reference to the accompanying drawing which will now be described, it being premised, however, that the invention may take various forms within the scope of the appended claims.

In this drawing, the numeral 2 designates a condenser which is indicated as being of the surface type. 3 designates a main feed water heater for heating the water from the condenser on its way to the boiler. 4 is the auxiliary heater which is employed for the purpose of absorbing the heat and the steam coming from the ejector and as a means for liberating air from the water before it goes to the main heater 3. 5 is a pump for delivering water from the condenser to the auxiliary heater 4. 6 is a valve which is located in a bypass 7 connecting the pipe 8 which leads from the pump 5 to the heater 4 with the pipe 9 leading from the heater 4 to the main heater 3. This valve 6 is designed to be controlled by the temperature to which the water in the heater 4 is heated. This may be done in various ways as by connecting the stem of the valve with a thermostatic element 10 in the heater 4. If the temperature in the heater 4 is low, the bypass valve 6 will be opened to a greater extent, thus diminishing the supply of water which passes to the heater 4, the result being a greater heating of such water. Conversely, if the temperature in the heater 4 rises, the valve 6 correspondingly closes, thereby forcing more water through the heater 4, so that the temperature is brought down to the prescribed limit.

For the best results, I prefer that the temperature in the heater 4 should not vary more than 50° from the boiling temperature.

The numeral 11 designates a steam ejector which exhausts air from the condenser 2, and which discharges through the pipe 12 into the heater 4.

The advantages of my invention will be apparent since it provides apparatus of simple form by which the objections heretofore urged to the use of steam ejectors in power plants is effectively overcome.

I claim:

1. In feed-water-heating apparatus of the character described, the combination with a condenser and a steam ejector arranged to exhaust the air and steam from the condenser, of a main feed water heater, an auxiliary feed water heater receiving heat from said ejector and vented to the atmosphere, a pump for delivering water from the condenser to said heaters, a bypass in the connection from the pump to the heaters, and means for automatically controlling the flow of water through said pipes and thereby the amount of water flowing from the auxiliary heater.

2. In feed-water-heating apparatus of the character described, the combination with a condenser and a steam ejector for exhausting air and steam therefrom, of a main feed water heater, an auxiliary feed water heater, said auxiliary heater being constructed to permit the release of air therefrom, means for delivering water from the condenser to the auxiliary heater, and means for automatically diverting a portion of such water and thereby controlling the amount of water supplied to the auxiliary heater.

3. In apparatus of the character described, the combination with a water heater constructed to prevent air accumulation therein and which receives air and steam from a condenser, of means for supplying water from the condenser to said heater, and means for automatically decreasing the water supplied to said heater as the temperature of water leaving the heater decreases whereby the air content in said condensate is kept at a minimum.

4. In apparatus of the character described, the combination with an open water heater which receives air and steam from a condenser, of means for supplying water from the condenser to said heater, means for automatically decreasing the water supplied to said heater as the temperature of water leaving the heater decreases, and means for increasing the water supplied to the heater as the temperature of the water leaving the heater increases whereby the air content of the condensate leaving the heater is maintained within certain limits.

5. The combination of a feed water heater, an auxiliary heater constructed to permit deaeration of the water therein and release of the air therefrom, and connections for supplying water through said heaters in series, of means for automatically limiting the water flow through the auxiliary heater in accordance with the temperature conditions therein while maintaining the total volume of water to the other heater substantially constant, whereby all of the water in said auxiliary heater will be brought to such a temperature as to facilitate air separation therefrom.

6. In a vented water-heating system, an ejector, a water heater receiving steam and air in combination from said ejector, a thermostatically controlled valve controlling the supply of water to the heater whereby the temperature of the water leaving the heater is maintained at a predetermined point such that air will be liberated, and means for receiving and bypassing any surplus water delivered to said valve.

7. The combination with a condenser, of a feed water heater receiving the condensate therefrom, an auxiliary vented-feed water heater cooperating with the feed water heater and adapted to receive a varying amount of said condensate during its travel to the feed water heater, and connections for supplying a mixture of air and steam to said auxiliary heater and also for variably controlling the condensate suppled thereto to condense the supply of steam for maintaining the temperature of the water leaving the heater within a definite range such that air will be liberated.

8. In combination, a feed water heater, an auxiliary heater vented to the atmosphere, and connections for supplying water through said heaters in series or directly to said heaters simultaneously, said connections compelling the delivery of all the water heated in one of said heaters into and through the other heater.

9. In combination, a feed water heater, an auxiliary heater vented to the atmosphere. connections for always supplying water through said heaters in series when both heaters are operating, and means for automatically varying the water flow through the first heater of the series in accordance with the temperature therein.

10. In a liquid treating apparatus, a condenser, a main heater receiving condensate therefrom, an auxiliary vented feed water heater adapted to preheat a varying amount of said condensate in accordance with the temperature in the auxiliary heater and to deliver the same to the main heater at a substantially constant temperature, and means to automatically maintain in the auxiliary heater a temperature sufficiently high to effectively expel air from the liquid being treated therein.

11. In a liquid treating apparatus, a condenser, a main heater adapted to receive condensate from said condenser, an auxiliary heater vented to the atmosphere and adapted to preheat a portion of said condensate and deliver the same to the main heater, an ejector withdrawing air and steam from said condenser and delivering the same to the auxiliary heater, and means controlled by the temperature in the auxiliary heater to automatically maintain therein conditions of low air solubility.

In testimony whereof, I have hereunto set my hand.

RAYMOND N. EHRHART.